United States Patent
Kobayashi (10) Patent No.: US 7,497,009 B2
(45) Date of Patent: Mar. 3, 2009

(54) MAIN POLE FORMING METHOD OF PERPENDICULAR MAGNETIC RECORDING HEAD

(75) Inventor: Kiyoshi Kobayashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/617,443

(22) Filed: Dec. 28, 2006

(65) Prior Publication Data

US 2007/0151095 A1    Jul. 5, 2007

(30) Foreign Application Priority Data

Jan. 4, 2006    (JP)    ............... 2006-000236

(51) Int. Cl.
G11B 5/127    (2006.01)
H04R 31/00    (2006.01)

(52) U.S. Cl. .............. 29/603.16; 29/603.12; 29/603.13; 29/603.15; 29/603.18; 216/22; 216/39; 216/41; 216/48; 216/65; 360/121; 360/122; 360/317; 451/5; 451/41

(58) Field of Classification Search ............... 29/603.11, 29/603.13–603.16, 603.18; 216/22, 39, 41, 216/48, 65; 360/121, 122, 126, 317; 451/5, 451/41

See application file for complete search history.

(56) References Cited

U.S. PATENT DOCUMENTS

| 2002/0080523 A1 | 6/2002 | Sato et al. |
| 2002/0080525 A1* | 6/2002 | Sato et al. ................. 360/126 |
| 2004/0032692 A1 | 2/2004 | Kobayashi |

FOREIGN PATENT DOCUMENTS

| JP | 06-251334 | 9/1994 |
| JP | 07-262519 | 10/1995 |
| JP | 8-167131 | 6/1996 |
| JP | 2002-197609 | 7/2002 |
| JP | 2002-197614 | 7/2002 |
| JP | 2003-263705 | 9/2003 |
| JP | 2004-79081 | 3/2004 |
| JP | 2005-235316 | 9/2005 |

OTHER PUBLICATIONS

Office Action issued in corresponding Japanese Patent Application No. 2006-000236; mailed Oct. 28, 2008.

* cited by examiner

*Primary Examiner*—Paul D Kim
(74) *Attorney, Agent, or Firm*—Brinks Hofer Gilson & Lione

(57) ABSTRACT

A main pole forming method is provided. The main pole forming method includes etching an exposed side face of a main pole layer, and the plated foundation film, thereby defining a recording track width. The method also includes etching the nonmagnetic insulating layer, and reattaching a material repelled from the nonmagnetic insulating layer to the side face of the main pole layer and a side face of the plated foundation film.

6 Claims, 6 Drawing Sheets

MAIN POLE FORMING METHOD OF PERPENDICULAR MAGNETIC RECORDING HEAD

This application claims the benefit of Japanese Patent Application No. 2006-000236 filed Jan. 4, 2006, which is hereby incorporated by reference.

TECHNICAL FIELD

The present embodiments relate to a main pole forming method of a perpendicular magnetic recording head.

BACKGROUND

As is widely known, a perpendicular magnetic recording head has a main pole layer and an auxiliary magnetic pole layer (return yoke layer) which are laminated with a nonmagnetic insulating layer therebetween in a surface that faces a recording medium. Coil layers apply a recording magnetic field to the main pole layer and the auxiliary magnetic pole layer.

The area of the main pole layer exposed to the surface that faces the recording medium is sufficiently smaller than the area of thee auxiliary magnetic pole layer. The main pole layer and the auxiliary magnetic pole layer are magnetically connected to each other on a deep side in the height direction. When the coil layers are energized, a recording magnetic field is induced between the main pole layer and the auxiliary magnetic pole layer, and this recording magnetic field perpendicularly enters a hard film of the recording medium from a leading face exposed to the medium-facing surface of the main pole layer, and returns to the auxiliary magnetic pole layer through a soft film of the recording medium. Accordingly, magnetic recording is performed in the portion of the recording medium that faces the main pole layer.

In a perpendicular magnetic recording head as described above, in order to improve recording density and prevent fringing at the time of skewing, the main pole layer that is formed on the nonmagnetic insulating layer has a shape, as viewed from the surface that faces the recording medium, that is a trapezoidal shape (bevel shape) which becomes narrow on the side of the nonmagnetic insulating layer.

In the related art, as described in, for example, Japanese Unexamined Patent Application Publication No. 2004-079081 (corresponding to US Pub. No. 2004032692A1), side milling is performed on a side face of a main pole layer after the main pole layer is formed on a nonmagnetic insulating layer using a frame plating method, thereby forming a trapezoidal main pole layer which becomes narrow on the side of the nonmagnetic insulating layer.

Recently, narrowing of a track is advanced so that it can be adapted to higher recording density. As described above, since the main pole layer is formed in inverted trapezoidal shape, when the recording track width is reduced, the width of a bottom part (on the side of the nonmagnetic insulating layer) of the main pole layer is reduced to be smaller than the recording track width. If the width of the bottom part of the main pole layer S becomes extremely small, the bottom part of the main pole layer often floats or the bottom part is often peeled off, during the manufacturing process. In a state where the main pole layer is unstable, the recording characteristics are degraded and the quality of a magnetic head deteriorates.

SUMMARY the present embodiments may obviate one or more of the limitations or drawbacks of the related art. For example, in one embodiment, a main pole forming method of a perpendicular magnetic recording head stably holds a formed main pole layer with narrow track width.

A material repelled from a plated foundation film created at the time of etching is utilized positively. The repelled material of the plated foundation film is reattached to at least a bottom part of a main pole layer. The bottom part can be protected (supported) without floating or being peeled off. If the plated foundation film is formed of a nonmagnetic material, even if the plated foundation film is reattached to the main pole layer, the recording track width of the main pole layer will not change, and the recording characteristics will not be affected.

In one embodiment, a main pole forming method of a perpendicular magnetic recording head forms a main pole layer on the a nonmagnetic insulating layer such that the shape of the magnetic pole layer, as viewed from a surface that faces a recording medium, is a trapezoidal shape which is narrow on the side of a nonmagnetic insulating layer.

In one embodiment, the main pole forming method includes forming a plated foundation film made of a nonmagnetic material on the nonmagnetic insulating layer; forming a resist that has a trapezoidal space on the plated foundation film; forming a main pole layer by plating within the trapezoidal space formed by the resist; removing the resist; etching an exposed side face of the trapezoidal main pole layer, and a part of the plated foundation film, thereby defining a recording track width; and etching the plated foundation film until the nonmagnetic insulating layer is exposed, and reattaching a material repelled from the plated foundation film to the side face of the main pole layer.

It is practical that the etching of the plated foundation film is performed by ion milling, and the milling angle is controlled to be 5° or more and 40° or less, whereby the plated foundation film is reattached to the side face of the main pole layer. The material etched and repelled from the plated foundation film is sequentially reattached upward from the bottom part 110b of the main pole layer 110. By the control of the milling angle, the side face of the main pole layer is not etched, but only the plated foundation film can be etched, and the plated foundation film can be reattached to not only the bottom part of the main pole layer but the whole main pole layer.

In one embodiment, the main pole forming method of a perpendicular magnetic recording head further includes etching the nonmagnetic insulating layer and reattaching a material repelled from the nonmagnetic insulating layer to the side face of the main pole layer to which the plated foundation film is attached, after the step of reattaching the plated foundation film. It is practical that the etching of the nonmagnetic insulating layer is performed by ion milling, and the milling angle is controlled to be 5° or more and 40° or less, whereby the nonmagnetic insulating layer is reattached to the side face of the main pole layer. When a material, which is etched and repelled from the nonmagnetic insulating layer, is further reattached from above the main pole layer to which the plated foundation film is attached, the main pole layer may be supported by the plated foundation film and a nonmagnetic insulating layer from the side face, and the main pole layer may be held more strongly.

In one embodiment, a main pole forming method of a perpendicular magnetic recording head forms a main pole layer on the a nonmagnetic insulating layer such that the shape of the magnetic pole layer, as viewed from a surface that faces a recording medium, is a trapezoidal shape which is narrow on the side of a nonmagnetic insulating layer.

The main pole forming method includes forming a plated foundation film made of a nonmagnetic material on the nonmagnetic insulating layer; forming a resist that has a trapezoidal space on the plated foundation film; forming a main pole layer by plating within the trapezoidal space formed by the resist; removing the resist; etching an exposed side face of the trapezoidal main pole layer, and the plated foundation film thereby defining a recording track width; and etching the nonmagnetic insulating layer, and reattaching a material repelled from the nonmagnetic insulating layer to the side face of the main pole layer and a side face of the plated foundation film.

In one embodiment, the etching of the nonmagnetic insulating layer is performed by ion milling, and the milling angle is controlled to be 5° or more and 40° or less, whereby the nonmagnetic insulating layer is reattached to the side faces of the main pole layer and plated foundation film.

The plated foundation film may be formed of one or two kinds of nonmagnetic materials selected from a group of, for example, NiP, Au, NiW, NiMo, NiPd, NiCr, Pd, Cr, Cu, Ti, or TiN. The plated foundation film may be a single-layer structure, or may be a laminated structure.

In one embodiment, since at least the bottom part of the main pole layer is supported from the side face by reattaching the plated foundation film made of a nonmagnetic material or a material etched and repelled from the nonmagnetic insulating layer, a main pole forming method of a perpendicular magnetic recording head that stably holds the formed main pole layer with narrow track width can be obtained.

DETAILED DESCRIPTION

Hereinafter, the present embodiments will be described with reference to the accompanying drawings. In each drawing, an X direction is defined as a track width direction, a Y direction is defined as a height direction, and a Z direction is defined as a lamination direction of each layer which constitutes a perpendicular magnetic recording head H and a movement direction of a recording medium M.

Figure 1:
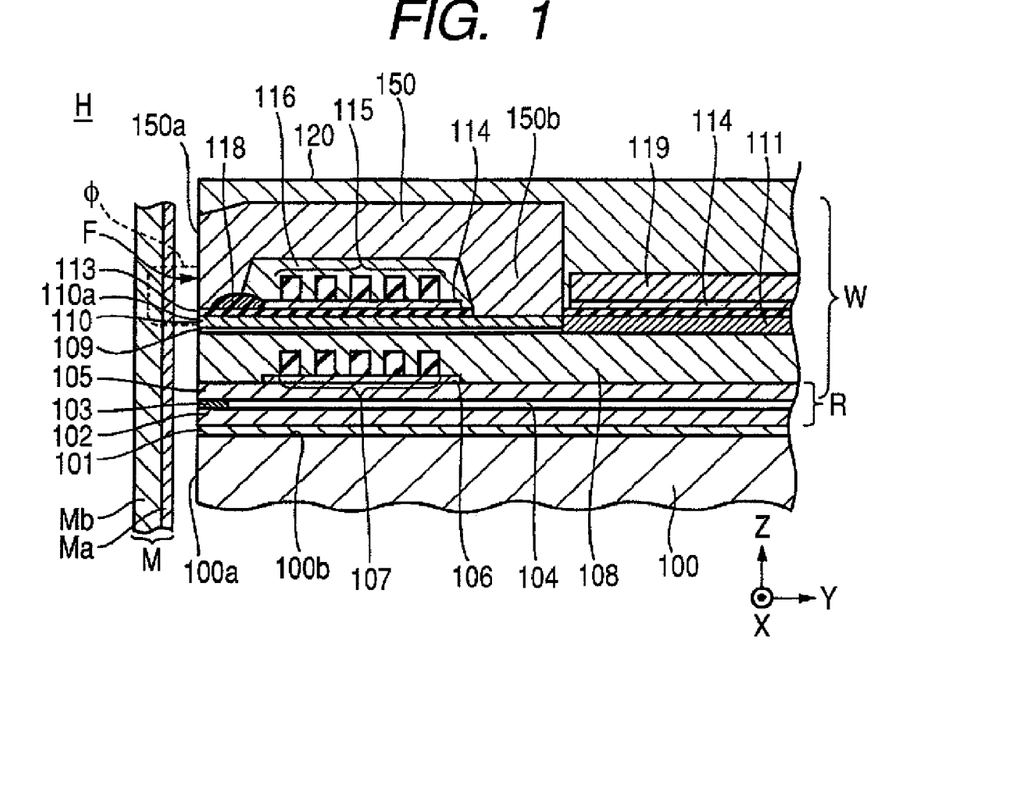
FIG. 1 is a sectional view that shows one embodiment of a laminated structure of a perpendicular magnetic recording head including a main pole layer.
Figure 2:
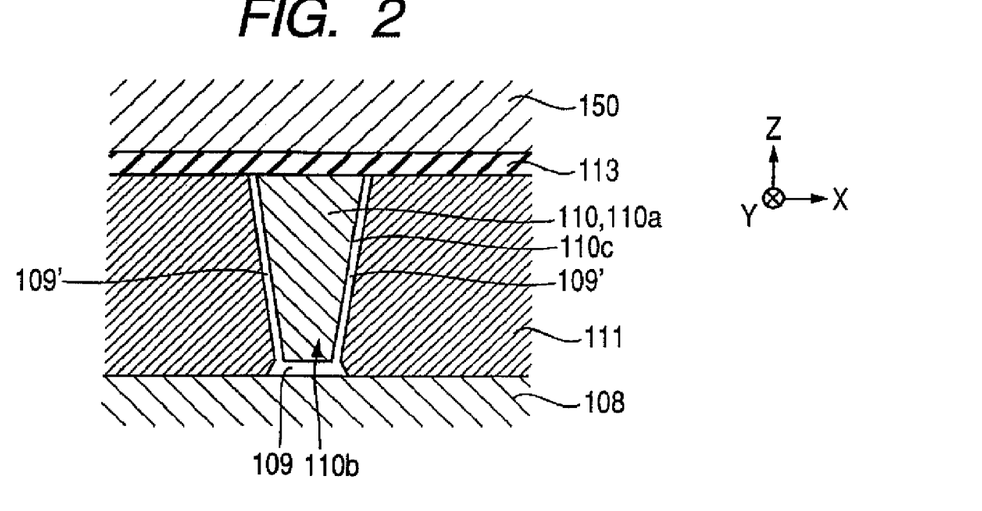
FIG. 2 is a partial sectional view that shows one embodiment of a main pole layer of FIG. 1 that is viewed from a medium facing surface.

FIG. 1 is a partial sectional view that shows one embodiment of a laminated structure of a thin film magnetic head H including a main pole layer viewed from the track width direction. FIG. 2 is a partial sectional view that shows one embodiment of the main pole layer of FIG. 1 viewed from a surface which faces the recording medium.

In one embodiment, as shown in FIG. 1, the thin film magnetic head H is a perpendicular magnetic recording head which has a reproducing element section R and a recording element section W. The reproducing element section R and the recording element section W are formed by laminating thin films on a trailing end face 100*b* of a slider 100, and which apply a perpendicular magnetic field Φ to the recording medium M to perpendicularly magnetize a hard film Ma of the recording medium M, thereby performing recording operation.

The recording medium M has a hard film Ma with high residual magnetization on the side of the medium surface, and has a soft film Mb with high magnetic transmittance further inside than the hard film Ma. This recording medium M is, for example, disk-like, and is rotated about the center of the disk which becomes the center of the axis of rotation.

The slider 100 is formed of a nonmagnetic material, for example, $Al_2O_3$ or TiC. A medium-facing surface 100*a* of the slider 100 faces the recording medium M, and when the recording medium M rotates, the slider 100 will float from the surface of the recording medium M by airflow on the surface of the recording medium.

A. nonmagnetic insulating layer 101, which may be made of an inorganic material, for example, $Al_2O_3$ or $SiO_2$, is formed on the trailing end face 100*b* of the slider 100, and the reproducing element section R is formed on the nonmagnetic insulating layer 101. The reproducing element section R has a lower shielding layer 102, an upper shielding layer 105, an inorganic insulating layer (gap insulating layer) 104 that fills a gap between the lower shielding layer 102 and the upper shielding layers 105, and a reproducing element 103 located within the inorganic insulating layer 104. The reproducing element 103 may be a magnetoresistive effect element, for example, AMR, GMR, or TMR.

A plurality of lower layer coils 107 formed of a conductive material are formed on the upper shielding layer 105, with a coil insulating foundation layer 106 therebetween. The lower layer coils 107 are made of, for example, one or two kinds of nonmagnetic metallic materials selected from a group of, for example, Au, Ag, Pt, Cu, Cr, Al, Ti, NiP, Mo, Pd, or Rh. Alternatively, the lower layer coils may be a laminated structure in which the nonmagnetic metallic materials are laminated. A nonmagnetic insulating layer 108 is formed around the lower layer coils 107.

A top surface of the nonmagnetic insulating layer 108 is planarized, a plated foundation layer 109 is formed on the planarized surface, and a main pole layer 110 is formed on the plated foundation film 109. The main pole layer 110 has given length L in the Y direction from a surface F facing the recording medium (hereinafter simply referred to as facing surface F). The X-direction dimension of the leading face 110a, which is exposed to the facing surface F, is defined as a recording track. width Tw. The main pole layer 110 is formed of a ferromagnetic material with high saturation magnetic flux density, for example, Ni—Fe, Co—Fe, or Ni—Fe—Co, by plating.

A first insulating material layer 111 is formed on both sides of the main. pole layer 110 in the X direction, and behind the main pole layer in the Y direction, and a magnetic gap layer 113 is formed on the main pole layer and the first insulating material layer 111. The first insulating material layer 111 and the magnetic gap layer 113 are made of, for example, a nonmagnetic insulating material, such as $Al_2O_3$, $SiO_2$, or Al—Si—O.

An upper layer coil 115 is formed on the magnetic gap layer 113, with a coil insulating foundation layer 114 therebetween. A plurality of the upper layer coils 115 are formed of a conductive material like the lower layer coils 107. The upper layer coils 115 are made of, for example, one or two kinds of nonmagnetic metallic materials selected from, for example, Au, Ag, Pt, Cu, Cr, Al, Ti, NiP, Mo, Pd, or Rh. Alternatively, the upper layer coils may be a laminated structure in which the nonmagnetic metallic materials are laminated.

Each of the lower layer coils 107 and each of the upper layer coils 115 are electrically connected to each other at their ends in the X direction so that they may have a solenoid shape. The shape of the coil layers (magnetic field generating means) is not limited to the solenoid shape and may take any suitable shape.

A nonmagnetic insulating layer 116 is formed around the upper layer coils 115, and an auxiliary magnetic pole layer (return yoke layer) 150 is formed of a ferromagnetic material, for example, a permalloy, from above the nonmagnetic insulating layer 116 to above the magnetic gap layer 113. The auxiliary magnetic pole layer 150 has a leading face 150a exposed to the facing surface F, and faces the main pole layer 110 in the facing surface F with gap spacing therebetween.

A rear end of the auxiliary magnetic pole layer 150 in the height direction is a connection 150b connected to the main pole layer 110. A throat height defining layer 118 is formed of an inorganic or organic material in a position which is on the magnetic gap layer 113 and is a predetermined distance away from the facing surface F. The throat height of the perpendicular magnetic recording head H is defined by the distance from the facing surface F to a front end edge of the throat height defining layer 118.

Behind the auxiliary magnetic pole layer 150 in the height direction, a lead layer 119, which extends from the upper layer coils 115, is formed with the coil insulating foundation layer 114 therebetween. The auxiliary magnetic pole layer 150 and the lead layer 119 are covered with a protective layer 120 formed of a nonmagnetic insulating material.

In the above perpendicular magnetic recording head H, as shown in FIG. 2, the shape of the main pole layer 110 as seen from the facing surface F is a trapezoidal shape which becomes narrow towards a bottom part 110b (toward the nonmagnetic insulating layer 108). The recording track width is about 130 nm and the dimension of the bottom part 110b of the main pole layer 110 in the track width direction is smaller than the recording track width. However, the track width is not limited to this dimension, and may increase or decrease as the technology advances. A side face 110c of the main pole layer 110 is covered with a reattachment film 109' of the plated foundation film 109, and this reattachment film 109' allows the main pole layer 110 to be stably held in a desired trapezoidal shape without floating from the bottom part 110b, or without collapsing. Since the plated foundation film 109 is formed of, for example, one or two kinds of nonmagnetic materials selected from, for example, NiP, Au, NiW, NiMo, NiPd, NiCr, Pd, Cr, Cu, Ti, or TiN, the recording track width of the main pole layer 110 is defined depending on the shape of the main pole layer 110 regardless of the reattachment film 109' which covers the bottom part 110b.

A method of forming the main pole layer 110 of FIG. 2 will be described with reference to FIGS. 3 to 6. FIGS. 3 to 6 are the partial sectional views that show embodiments of main pole forming method viewed from the facing surface F.

Figure 3:
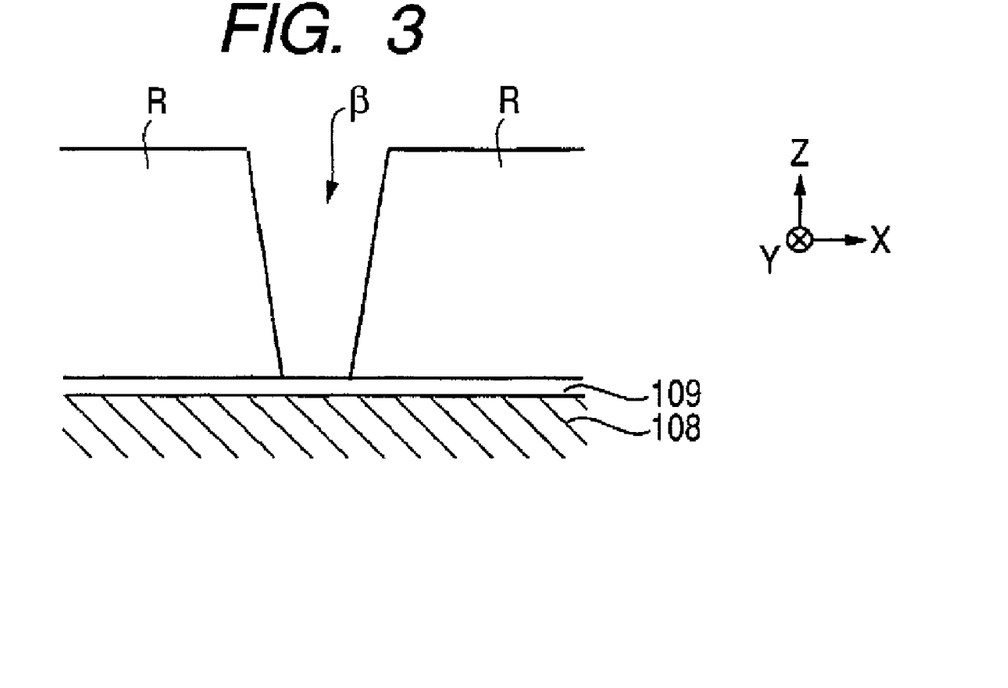
FIG. 3 is a partially sectional view that shows one embodiment of the main pole forming method viewed from the medium-facing surface.

In one embodiment, as shown in FIG. 3, a plated foundation film 109 made of a nonmagnetic material is formed on a nonmagnetic insulating layer 108. In one embodiment, the plated foundation film 109 may be formed of, for example, one or two kinds of nonmagnetic materials of, for example, NiP, Au, NiW, NiMo, NiPd, NiCr, Pd, Cr, Cu, Ti, or TiN.

In one embodiment, as shown in this FIG. 3, a resist layer R is formed on the plated foundation film 109, and a trapezoidal space β which becomes narrow towards the nonmagnetic insulating layer 108 is provided by the resist layer R.

Figure 4:
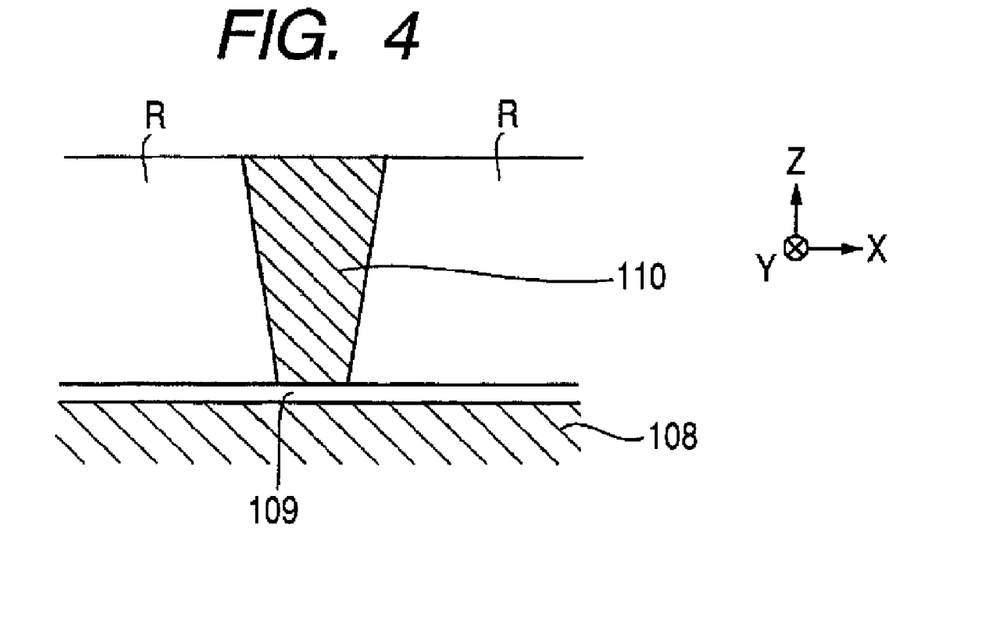
FIG. 4 is a partial sectional view that shows one embodiment of the main pole forming method viewed from the medium facing surface.

In one embodiment, as shown in FIG. 4 a main pole layer 110 made of a ferromagnetic material is formed by plating within the trapezoidal space β formed by the resist layer R. The main pole layer 110 may be formed from NiFe—X (here, X is one or two kinds of, for example, Tc, Ru, Rh, Pd, Re, Os, Ir, Pt, or S), FeCo—X' (here, X'is one or two kinds of, for example, Pd, Pt, Ru, Ir, Ni, Cr, or Rh), or FeCo.

Figure 5:
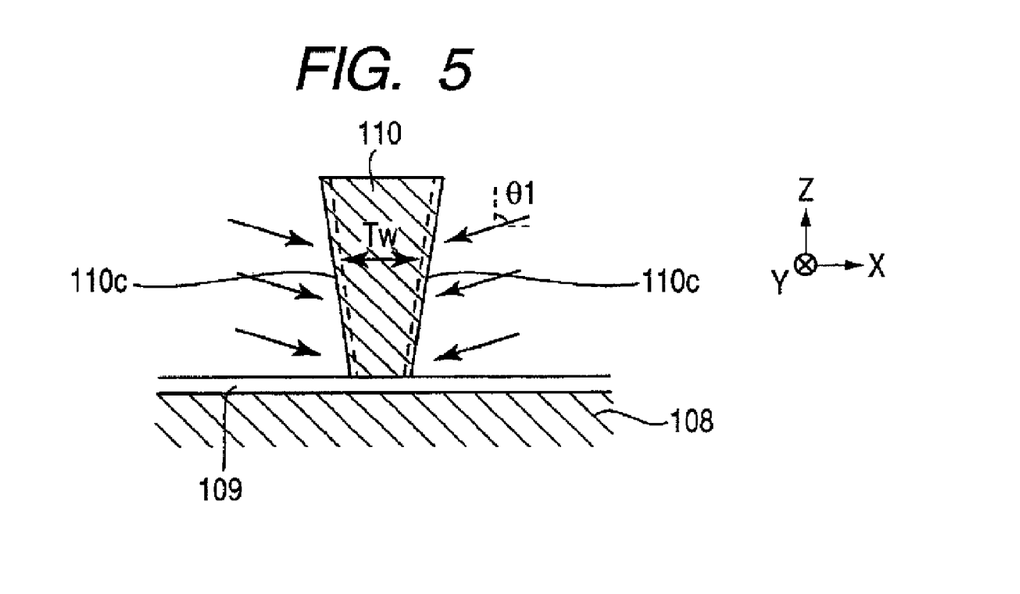
FIG. 5 is a partial sectional view that shows one embodiment of the main pole forming method viewed from the medium facing surface.

In one embodiment, as shown in FIG. 5, the resist layer R is removed, and a side face 110c of the main pole layer 110 which forms a trapezoidal shape is etched (side etching), thereby defining a recording track width Tw. This etching process is performed by ion milling, and the milling angle θ1 is controlled to be about $45° \leq \theta 1 \leq 75°$. The arrow direction of FIG. 5 is the direction of milling.

Figure 6:
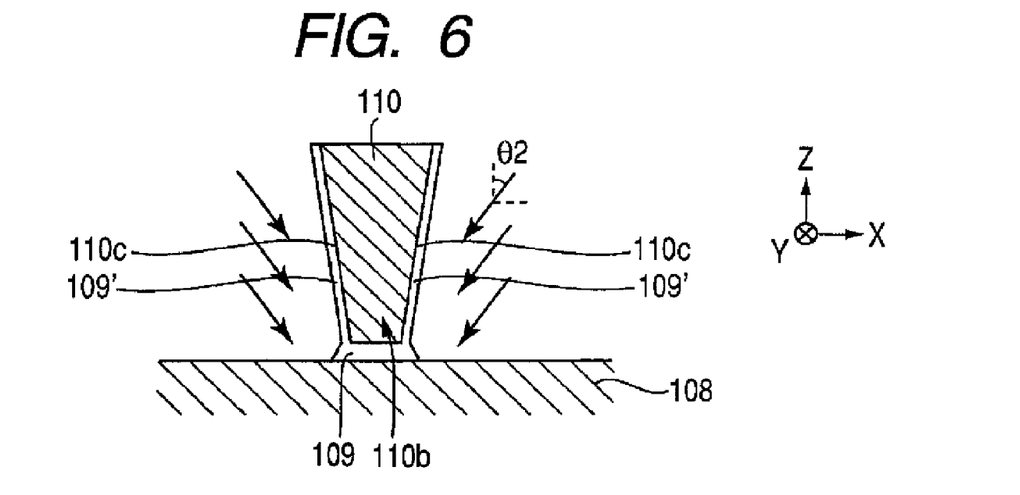
FIG. 6 is a partial sectional view that shows one embodiment of the main pole forming method viewed from the medium facing surface.

In one embodiment, as shown in FIG. 6, the plated foundation film 109 is etched until the nonmagnetic insulating layer 108 is exposed, and a material repelled from the plated foundation film 109 is reattached to the side face 110c of the main pole layer 110.

When the plated foundation film 109 is shaved by etching, it hits the plated foundation film 109 or the nonmagnetic insulating layer 108 under the plated foundation film 109, is repelled therefrom, and is sequentially reattached upward from the bottom part 110b of the main pole layer 110. For example, the reattachment film 109' of the plated foundation film 109 is formed on the side face 110c of the main pole layer 110. This bottom etching process is performed by ion milling, and a milling angle θ2 is controlled to be in a range of $5° \leq \theta 2 \leq 40°$, so that only the plated foundation film 109 can be etched without causing etching damage to the main pole layer 110, and the plated foundation film 109 can be reattached to the whole side face 110c of the main pole layer 110. Then reattachment film 109' of the plated foundation film 109 formed on the side face 110c of the main pole layer 110 supports the main pole layer 110 from the side face to stabilize the shape and position of the main pole layer 110.

In this embodiment, since the plated foundation film 109 is formed of a nonmagnetic material, even if it is reattached to the side face 110c of the main pole layer 110, it does not affect the magnetic properties of the main pole layer 110, and the recording track width of the main pole layer 110 is maintained at a dimension defined in the above side etching process.

The main pole layer 110 of the perpendicular magnetic recording head H shown in FIG. 2 is obtained by the above processes.

Another embodiment of the method of forming the main pole of the perpendicular magnetic recording head will be described with reference to FIGS. 7 and 8.

Figure 7:
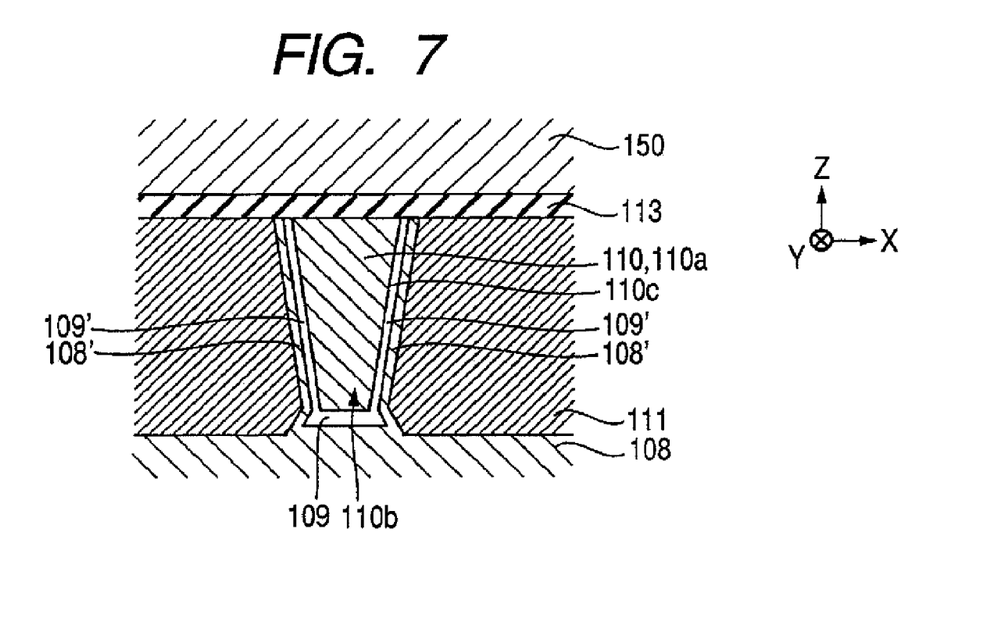
FIG. 7 is a partial sectional view that shows one embodiment of a main pole layer formed according to a another embodiment of a main pole forming method viewed from a medium facing surface.

In one embodiment, in the main pole layer 110 it's the side face 110c, as shown in FIG. 7, is covered with two layers of the reattachment film 109' formed of a material etched and repelled from the plated foundation film 109, and a reattachment film 108' formed of a material etched and repelled from the nonmagnetic insulating layer 108.

The two-layer reattachment films 109' and 108' allow the main pole layer 110 to be stably held in a desired trapezoidal shape without floating or being peeled off from the bottom part 110b. Since the nonmagnetic insulating layer 108 is nonmagnetic, even if it is reattached to the side face 110c of the main pole layer 110, it does not affect the magnetic properties of the main pole layer 110.

Figure 8:
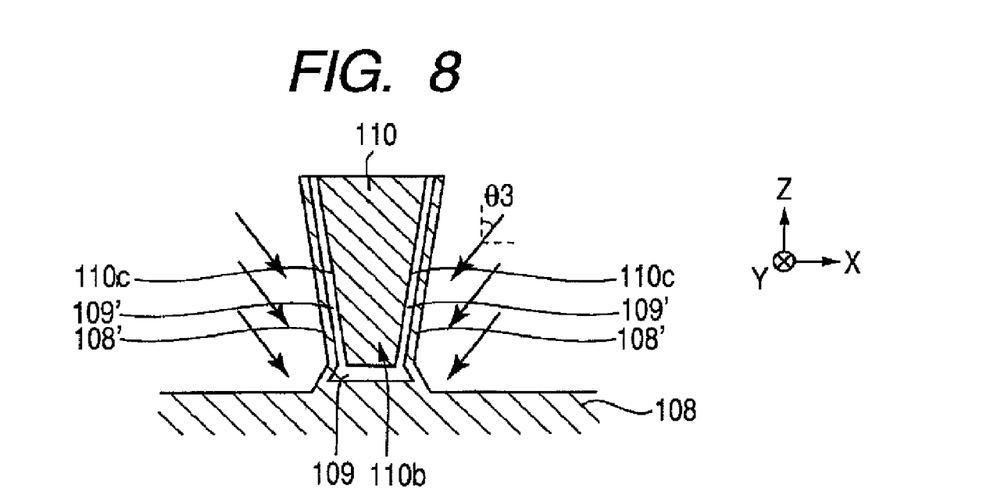
FIG. 8 is a partial sectional view that shows one embodiment of the main pole forming method viewed from the medium-facing surface.

This main pole layer 110 is obtained. by performing the same processes as those of the first embodiment till the process of reattaching the plated foundation film 109 to the side face 110C of the main pole layer 110, and subsequently, as shown in FIG. 8, etching the nonmagnetic insulating layer 108, and reattaching a material repelled from the nonmagnetic insulating layer 108 to the side face 110c of the main pole layer 110. The etching process of the nonmagnetic insulating layer 108 is performed by ion milling similarly to the etching process of the plated foundation film 109, and the milling angle $\theta 3$ is controlled to be in a range of about $5°\leq\theta 2\leq 40°$, so that only the nonmagnetic insulating layer 108 can be etched without causing etching damage to the reattachment film 109' of the main pole layer 110 and the plated foundation film 109, and the nonmagnetic insulating layer 108 can be reattached to the whole side face 110c of the main pole layer 110.

According to one embodiment, the main pole layer 110 may be more strongly held than in the first embodiment in which the side face 110c of the main pole layer 110 is covered with a monolayer (reattachment film 109' of the plated foundation film 109).

Another embodiment of the main pole forming method of the perpendicular magnetic recording head will be described with reference to FIGS. 9 to 11.

Figure 9:
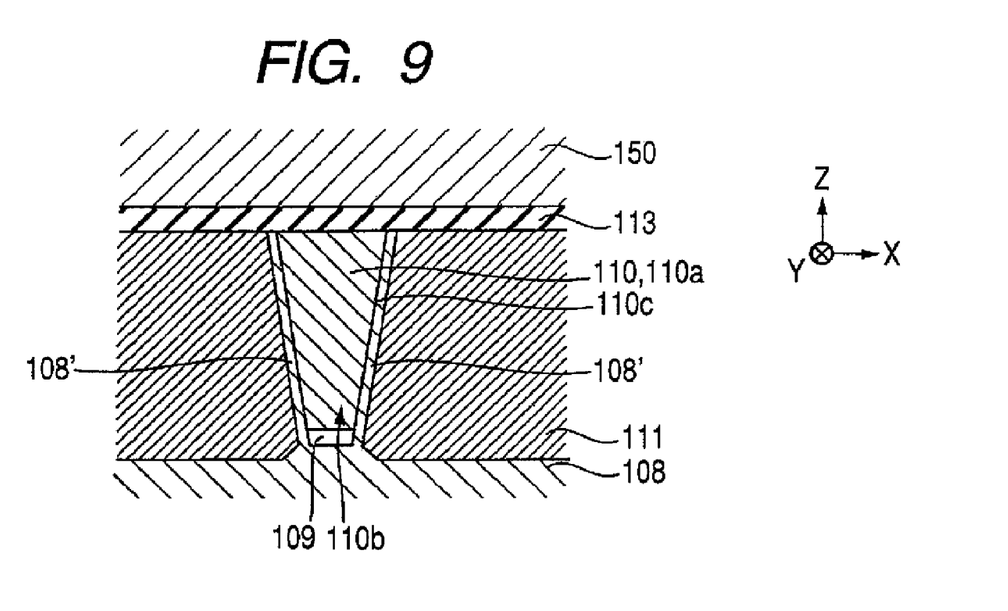
FIG. 9 is a partial sectional view that shows one embodiment of a main pole layer viewed from the medium-facing surface.

In one embodiment, as shown in FIG. 9, both the main pole layer 110 and the plated foundation film 109 form a trapezoidal shape which becomes narrow towards the nonmagnetic insulating layer 108, and the side faces of the main pole layer 110 and plated foundation film 109 are covered with the reattachment film 108' of the nonmagnetic insulating layer 108. The reattachment film 108' of the nonmagnetic insulating layer 108 allows the main pole layer 110 to be stably held in a desired trapezoidal shape without floating. from the bottom part 110b, or without collapsing.

Figure 10:
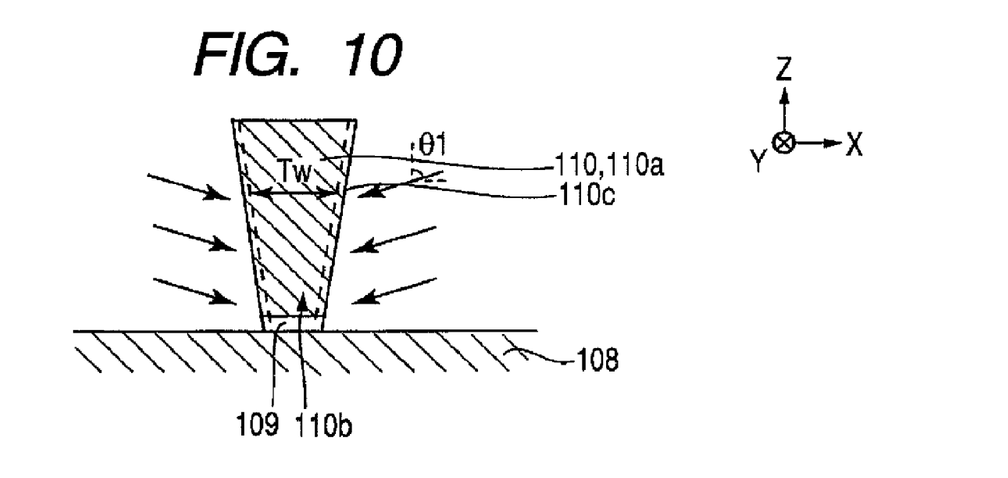
FIG. 10 is a partial sectional view that shows one embodiment of the main pole forming method viewed from a medium-facing surface.
Figure 11:
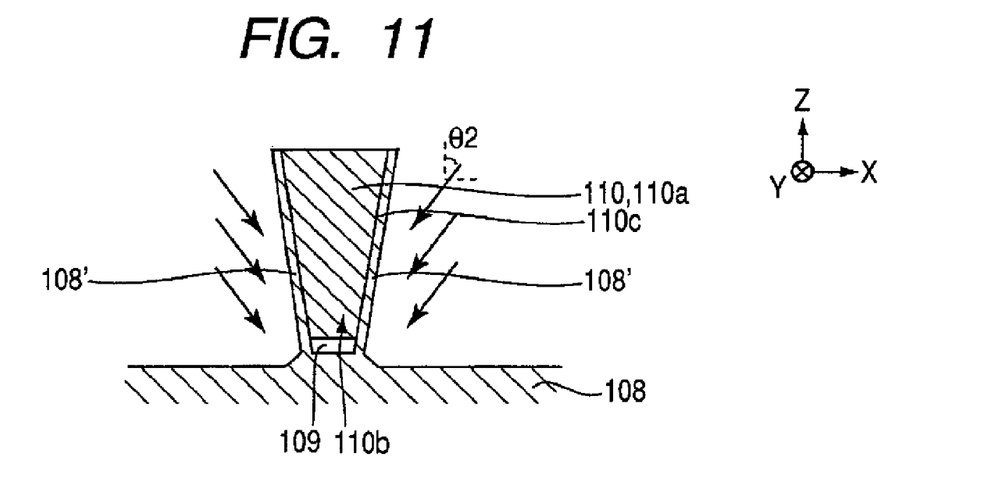
FIG. 11 is a partial sectional view that shows one embodiment of the main pole forming method viewed from the medium-facing surface.

FIGS. 10 and 11 are partial sectional views that show that a embodiment of the main pole forming method viewed from the facing surface F.

In one embodiment, a plated foundation film 109 is formed on a nonmagnetic insulating layer 108, a resist layer R that has a trapezoidal space β which becomes narrow towards the nonmagnetic insulating layer 108 is formed on the plated foundation film 109, and a main pole layer 110 is formed by plating within the trapezoidal space β (refer to FIGS. 3 and 4).

When the main pole layer 110 is formed, as shown in FIG. 10, the resist layer R is removed, and the side face 110c of the main pole layer 110 and the plated foundation film 109 are etched (side etching), thereby defining the recording track width Tw. This etching process is performed by ion milling, and the milling angle $\theta 1$ is controlled to be about $45°\leq\theta 1\leq 75°$. The arrow direction of FIG. 5 is the direction of milling. Here, the whole plated foundation film 109 exposed from the main pole layer 110 is removed by the etching, and the plated foundation film 109 is left only in a lower layer position of the main pole layer 110. The left plated foundation film 109 forms a trapezoidal shape along with the main pole layer 110.

In one embodiment, as shown in FIG. 11, the nonmagnetic insulating layer 108 is etched and a material repelled from the nonmagnetic insulating layer 108 is reattached to the side faces of the main pole layer 110 and plated foundation film 109. This bottom etching process is performed by ion milling, and the milling angle $\theta 2$ is controlled to be in a range of $5°\leq\theta 2\leq 40°$, so that only the nonmagnetic insulating layer 108 is etched without causing etching damage to the main pole layer 110 and the plated foundation film 109. The reattachment film 108' from the nonmagnetic insulating layer 108 is reattached to the whole side faces of the main pole layer 110 and plated foundation film 109. The reattachment film 108' formed on the side faces of the main pole layer 110 and plated foundation film 109 supports the main pole layer 110 and the plated foundation film 109 from the side face to stabilize the shape and position of the main pole layer 110. Since the nonmagnetic insulating layer 108 is nonmagnetic 110 similarly to the first and second embodiments, even if it is reattached to the side face 110c of the main pole layer, it does not affect the magnetic properties of the main pole layer 110, and the recording track width of the main pole layer 110 is maintained at a dimension defined in the above side etching process.

The main pole layer 110 shown in FIG. 7 is obtained by the above processes.

According to each of the above embodiments, since the main pole layer 110 is supported from the side face 110c by reattaching a material etched and repelled from at least any one of the plated foundation film 109 or the nonmagnetic insulating layer 108, which are made of a nonmagnetic material, even if the dimension of the main pole layer in the track width direction becomes small by a narrowed track, floating or peeling-off of the bottom part of the main pole layer can be prevented, and the formed main pole layer can be held stably. This also improves the quality of a magnetic head.

Although each embodiment has been described that the whole side face 110c of the main pole layer 110 is covered with the reattachment film 109' (108'), it is sufficient if only the reattachment film 109' (108') covers at least the bottom part 110b of the main pole layer 110. Moreover, a protective layer which prevents the top surface of the main pole layer 110 from being shaved during the side etching can also be formed in the top surface of the main pole layer 110.

Although the embodiments to which the method are applied to a main pole layer of a so-called perpendicular magnetic recording head that has a seal dead ball structure has been described hitherto, the method may also be applied to a main pole layer of a single-pole-type perpendicular magnetic recording head.

The invention claimed is:

1. A main pole forming method which forms a main pole layer on a nonmagnetic insulating layer, the method comprising:

forming a plated foundation film made of a nonmagnetic material on the nonmagnetic insulating layer;

forming a resist having a space on the plated foundation film;

forming a main pole layer by plating within the space formed by the resist;

removing the resist;

etching an exposed side face of the main pole layer, and the plated foundation film, thereby defining a recording track width; and etching the nonmagnetic insulating layer, and reattaching a material etched from the nonmagnetic insulating layer to the side face of the main pole layer and a side face of the plated foundation film.

2. The main pole forming method according to claim 1, wherein the etching of the nonmagnetic insulating layer is performed by ion milling, and the milling angle is controlled to be 5° or more and 40° or less, whereby the nonmagnetic insulating layer is reattached to the side faces of the main pole layer and plated foundation film.

3. The main pole forming method according to claim 1, wherein a perpendicular magnetic recording head comprises the main pole layer and the nonmagnetic insulating layer.

4. The main pole forming method according to claim 1, wherein forming a resist having a space on the plated foundation film comprises forming a trapezoidal space.

5. The main pole forming method according to claim 1, wherein the plated foundation film comprises at least one nonmagnetic material.

6. The main pole forming method according to claim 5, wherein the plated foundation film is formed of at least one material selected from the group consisting of NiP, Au, NiW, NiMo, NiPd, NiCr, Pd, Cr, Cu, Ti, and TiN.

* * * * *